United States Patent [19]

Vogel

[11] Patent Number: 5,699,985
[45] Date of Patent: Dec. 23, 1997

[54] PORTABLE MOTORCYCLE CARRIER

[76] Inventor: Robert D. Vogel, Rte. #1- Box 65, Mandan, N. Dak. 58554

[21] Appl. No.: 125,455

[22] Filed: Sep. 22, 1993

[51] Int. Cl.⁶ .................................................. B60R 7/00
[52] U.S. Cl. ................ 224/564; 224/545; 224/549; 224/924; 224/521
[58] Field of Search ................ 224/545–564, 224/521

[56] References Cited

U.S. PATENT DOCUMENTS

| | | | |
|---|---|---|---|
| 3,176,903 | 4/1965 | Farley | 224/521 |
| 5,215,234 | 6/1993 | Pasley | 224/521 |
| 5,224,636 | 7/1993 | Bounds | 224/521 |

*Primary Examiner*—David J. Walczak

[57] ABSTRACT

Over the years, many times, motorcycle carriers have been affixed to the front or rear portions of four wheeled vehicles in order to transport recreational type motorcycles. My invention not only affixes to the rear or front of most four wheeled vehicles, but will then independently support the motorcycle or all terrain vehicle loaded upon it. All that is required to install the device is a pre-manufactured standard class three hitch receiver installed on a four wheeled vehicle. The outstanding features are: the device can be assembled or stored in a provided container until future use; thus, being portable in the truest sense. In addition, the device can be used as a tow hitch at the same time it is used as a carrier.

1 Claim, 9 Drawing Sheets

PORTABLE MOTORCYCLE CARRIER

Over the years, many times, motorcycle carriers have been affixed to the front or rear portions of four wheeled vehicles in order to transport recreational type motorcycles.

My invention not only affixes to the rear or front of most four wheeled vehicles, but will then independently support the motorcycle or all terrain vehicle loaded upon it. All that is required to install the device is a pre-manufactured standard class three hitch receiver installed on a four wheeled vehicle.

The outstanding features are: the device can be assembled or stored in a provided container until future use; thus, being portable in the truest sense.

In addition, the device can be used as a tow hitch at the same time it is used as a carrier.

SUMMARY

Features not found in any other motorcycle or all terrain vehicle carrier are:

(1) The lightness in weight and the strength and durability of the device.

(2) The uncomplicated procedure the device can be installed, assembled and unassembled.

(3) The ability of the device to support two, three or four wheeled motorcycles, all terrain vehicles or snowmobiles.

(4) The ease in which a motorcycle or all terrain vehicle can be loaded upon it or unloaded from the device as it affords interchangeable, detachable ramps.

The adaptability of the device to be used to carry lightweight as well as the heaviest motorcycles, all terrain vehicles or snowmobiles. It must be understood, the four wheeled vehicle upon which the device is used, must be equipped with adequate suspension and suitable size as to safely support the weight being carried on said device.

The convenience of the device, to be stored away in a disassembled state and contained in a provided container.

My device has an extra dimension, not found in prior art, that: while in the assembled state and installed on a four wheeled vehicle and carrying a motorcycle, said device at the same time can also be used as a towing hitch for an additional vehicle, such as a trailer, a boat or an automobile.

BRIEF DESCRIPTION OF THE DRAWINGS

In the drawings attached hereto and forming a part of

DESCRIPTION OF PREFERRED EMBODIMENTS

Referring to said drawings wherein: like numerals represent like parts throughout.

Figure 4:
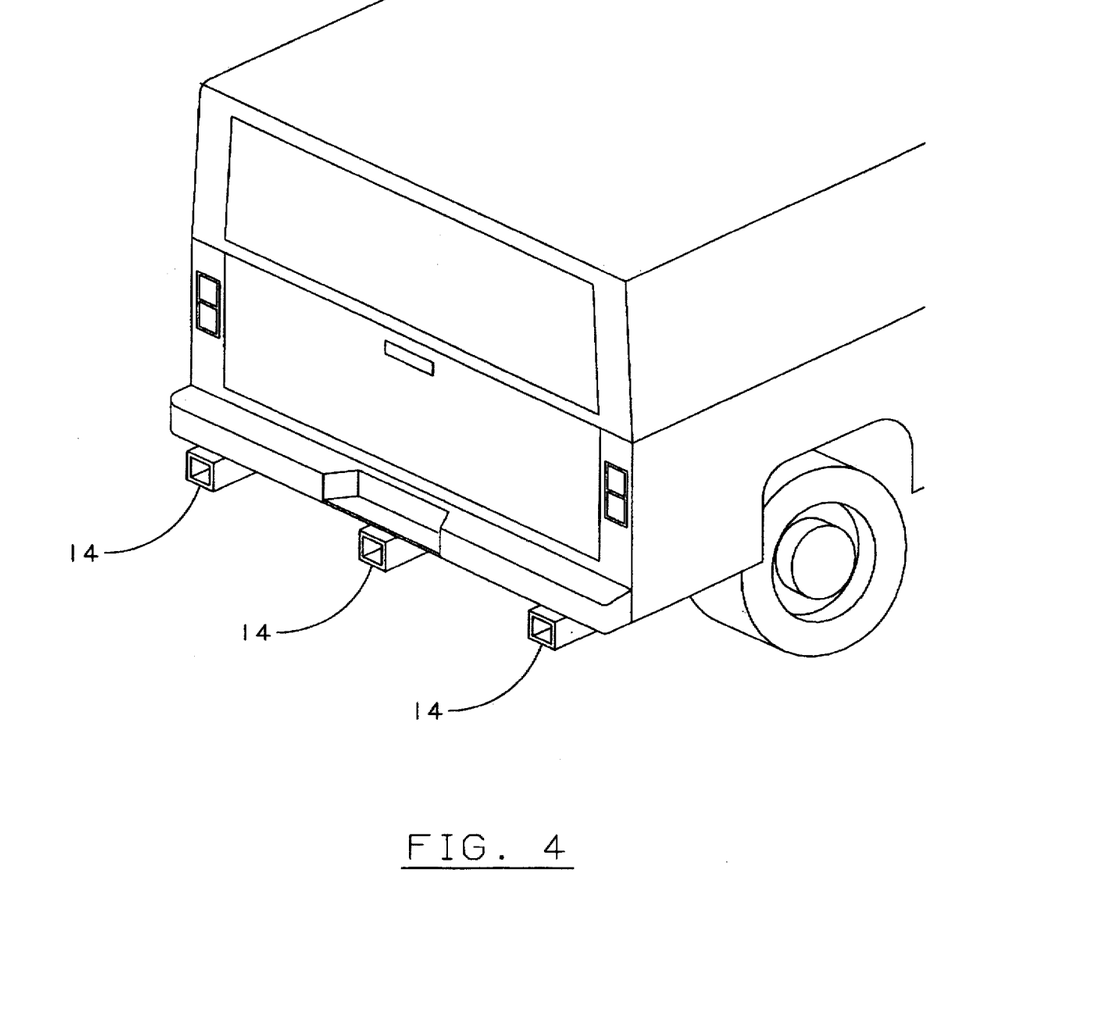
FIG. 4 is a perspective view of two additional class three hitch receivers, totaling three in number, on the rear of a road vehicle, that would be used to support my device.

My portable carrier is easily inserted into a single pre-manufactured class three hitch receiver or three hitch receivers as in FIG. 4 represented by numeral 14 as they are attached to the lower rear portion of a four wheeled road vehicle.

Numeral 10 represents a main tube with attached perfect angle receivers that will receive auxiliary tubes represented by numeral 12, when being used with a single hitch receiver 14.

Auxiliary tubes 12 support the non-mating ends of ramps 18 and 19 and the mating ends of ramps 18 and 19 are supported by 10. Ramps 18 and 18a are interchangeable as in FIG. 1. Numeral 10, 12, 18 and 19 are bolted securely together to form the integral supporting parts of my device. Loading ramp 18a is supported by the non-mating end of ramp 18 when loading or unloading a motorcycle.

Figure 7:
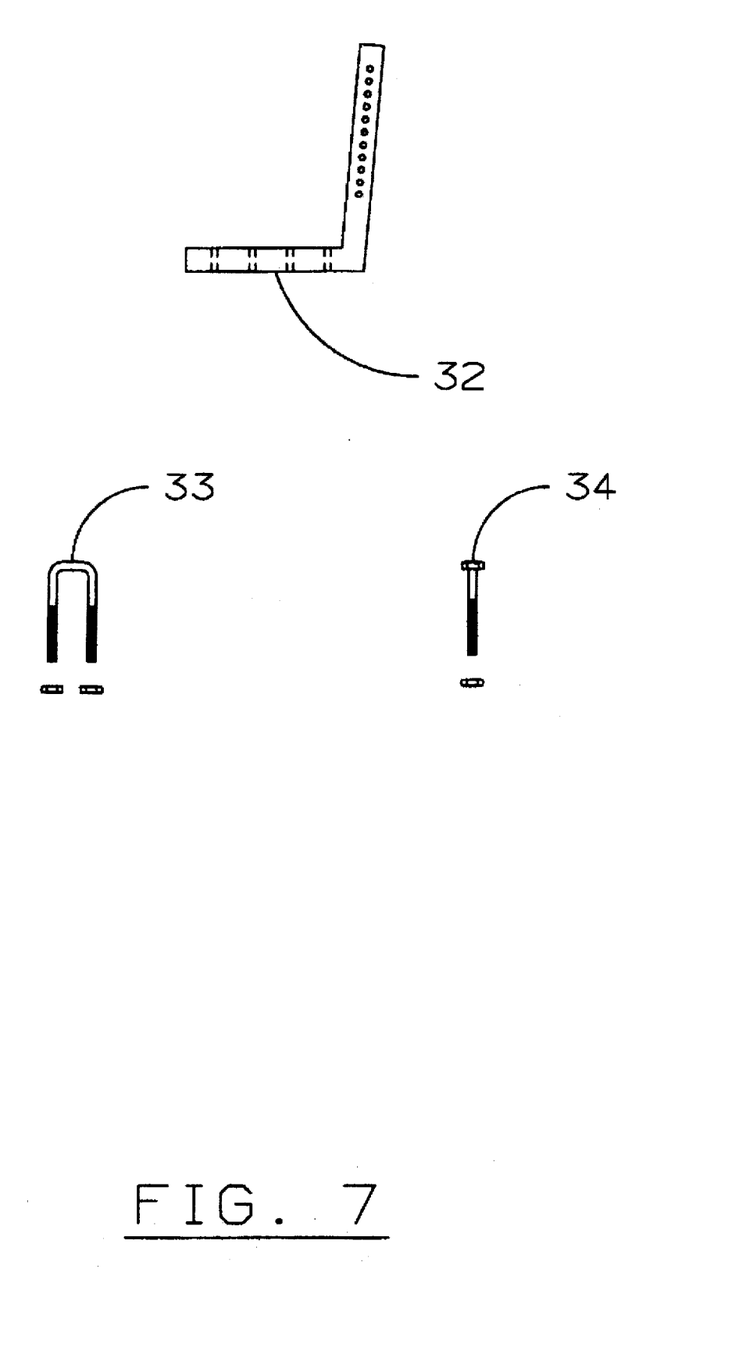
FIG. 7 is a side view of the upright brace provided and used as the vertical support for a motorcycle, all terrain vehicle or snowmobile. Attaching bolt and clamp are also shown as additional illustration in FIG. 7.

The vertical brace in FIG. 7, represented by numeral 32 incorporates an adjustable slide. Numeral 32 is attached to my device, in various positions with clamp 33 and bolt 34 as also illustrated in FIG. 7. The purpose of 32 is to prohibit forward or rearward movement of the upper portion of the motorcycle, being carried.

Figure 3:
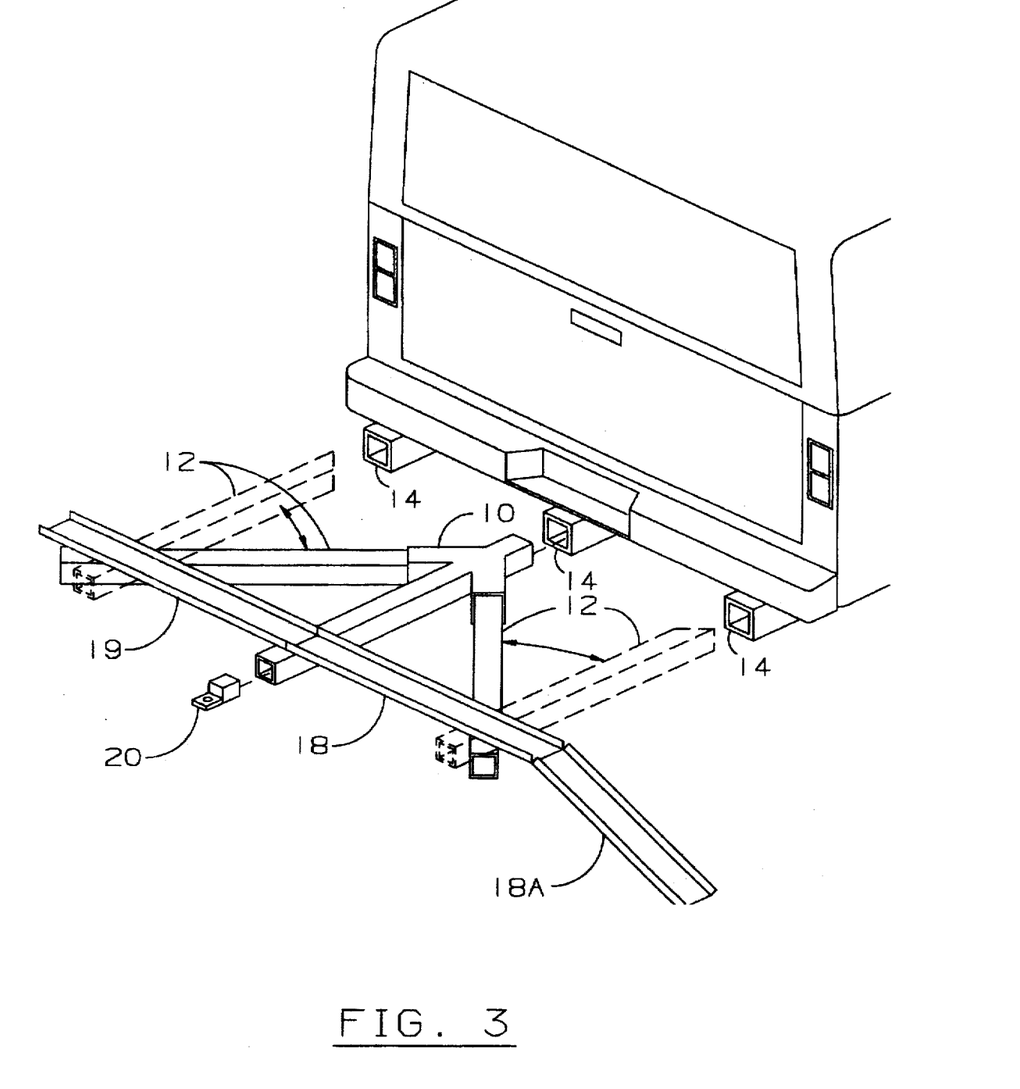
FIG. 3 is a top view of my device showing an additional use of the auxiliary tubes shown in broken lines. In addition, the trailer ball mount is shown as it would be inserted into the device, when being used for it's function.

As in FIG. 3, a trailer ball mount 20, is inserted into tube 10 and bolted securely, when the device is being used as a motorcycle carrier and a towing hitch at the same time.

Figure 5:
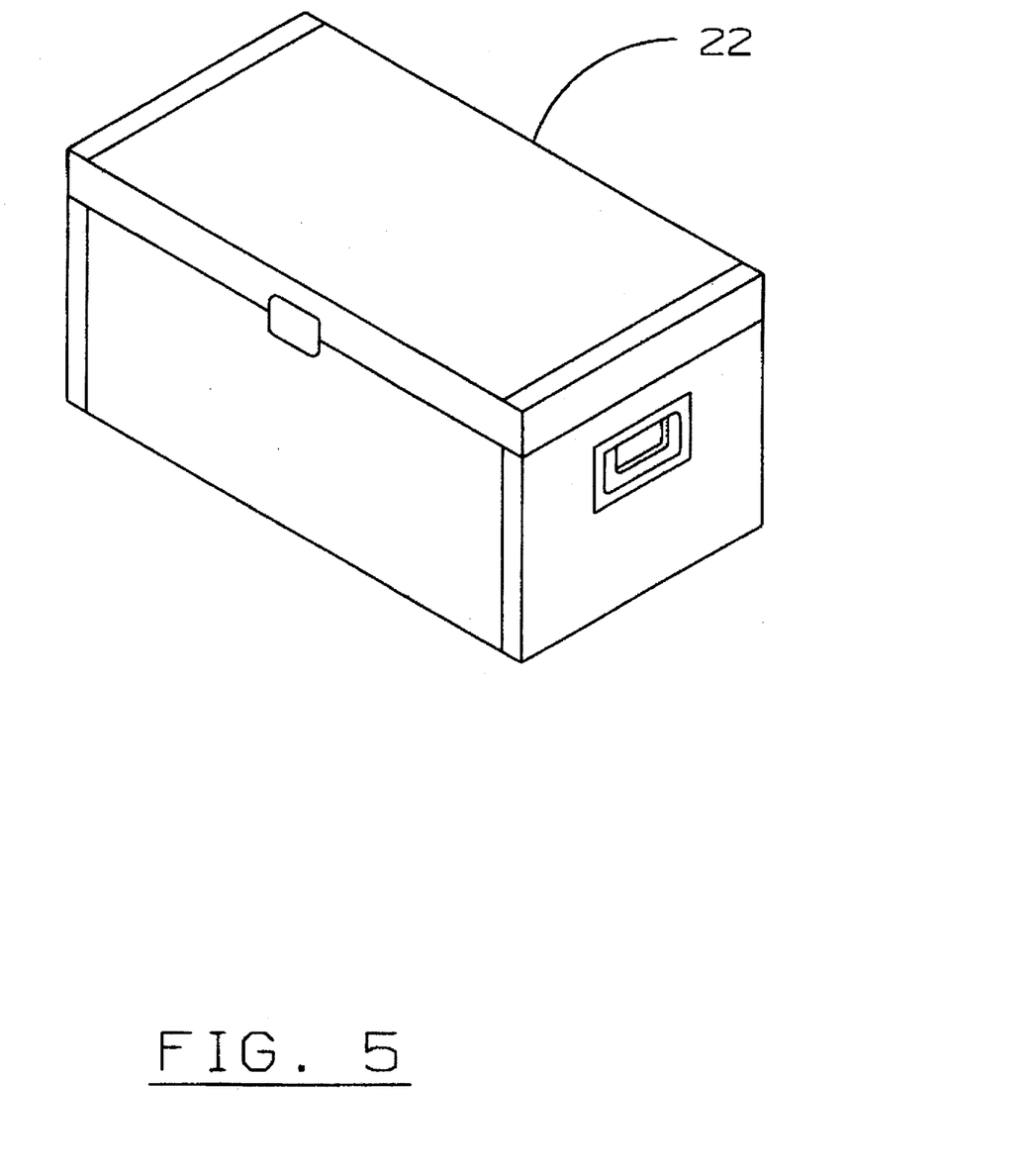
FIG. 5 is a frontal view of a compact but ample sized storage container to store my device when disassembled and not in use.

As in FIG. 5, element 22 depicts a storage container which is sized to fit the various elements of my device when the device is taken apart.

Figure 8:
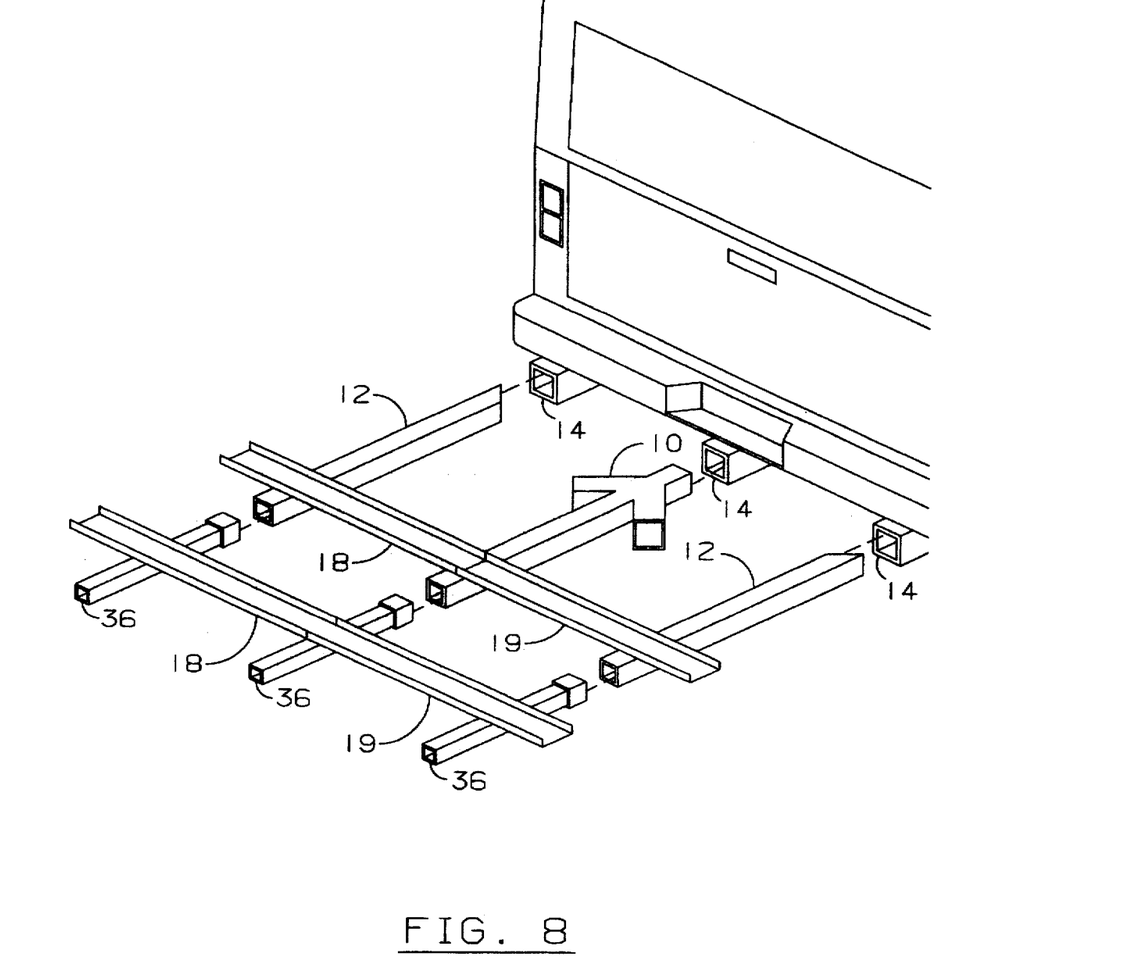
FIG. 8 is a perspective view of three extension tubes that would be afforded as an addition to the device being shown. The ramps and additional ramps used in this application, are also shown.

As in FIG. 8, the extension tubes 36 are slid over and bolted onto tubes 10 and 12 to form support for additional ramps 18 and 19. This application, is used to carry multiple motorcycles and three or four wheeled all terrain vehicles.

Figure 9:
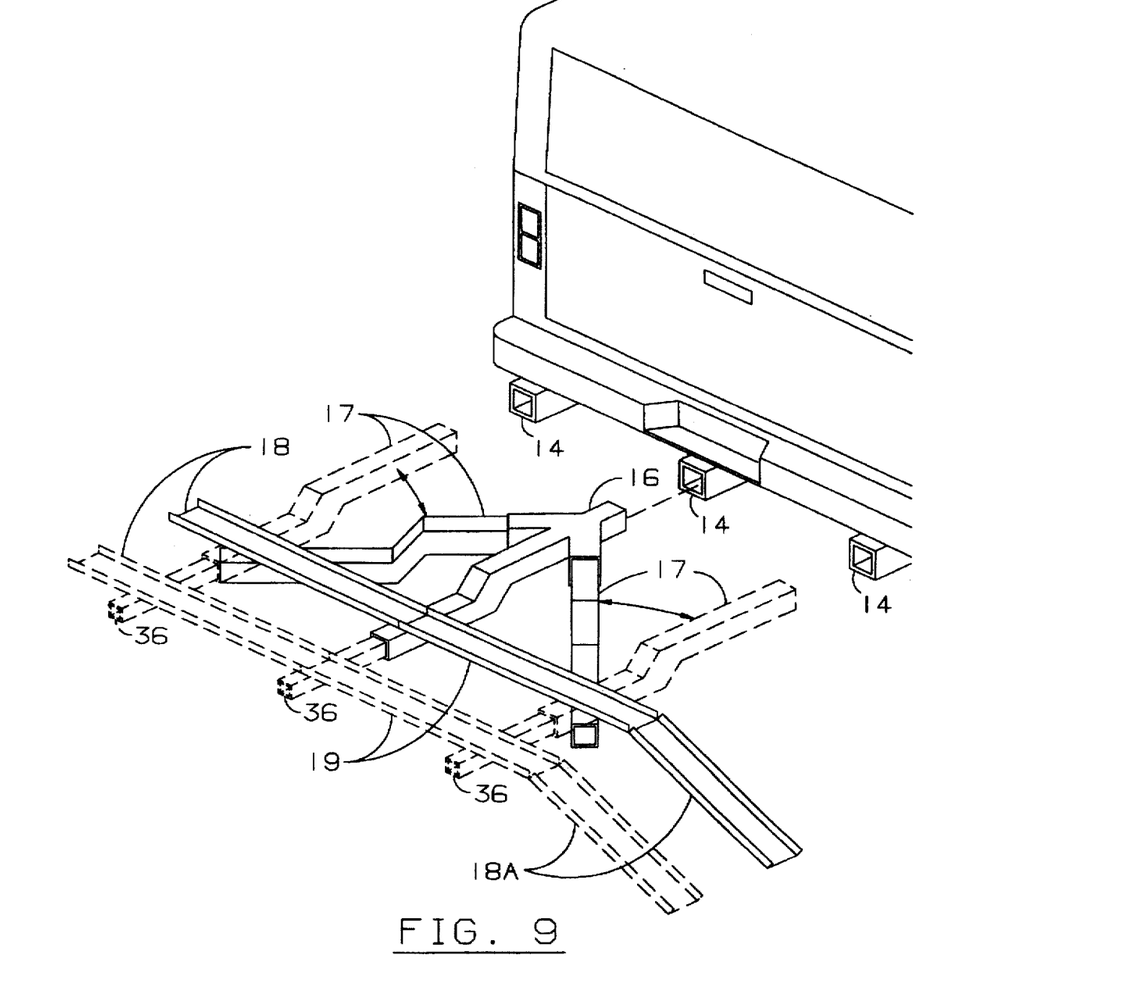
FIG. 9 is a perspective view of my device showing a modified version to be used with high ground clearance road vehicles. The additional ramps and extension tubes are shown in broken lines, as they would be used in this modification.

As in FIG. 9, is a main tube, modified, represented by numeral 16 and auxiliary modified tubes, 17, used to support 18 and 19. The extension tubes 36 and additional ramps 18 and 19 are shown in broken lines. This application, is used on high profile road vehicles, to locate ramps 18 and 19 closer to the terrain.

Figure 1:
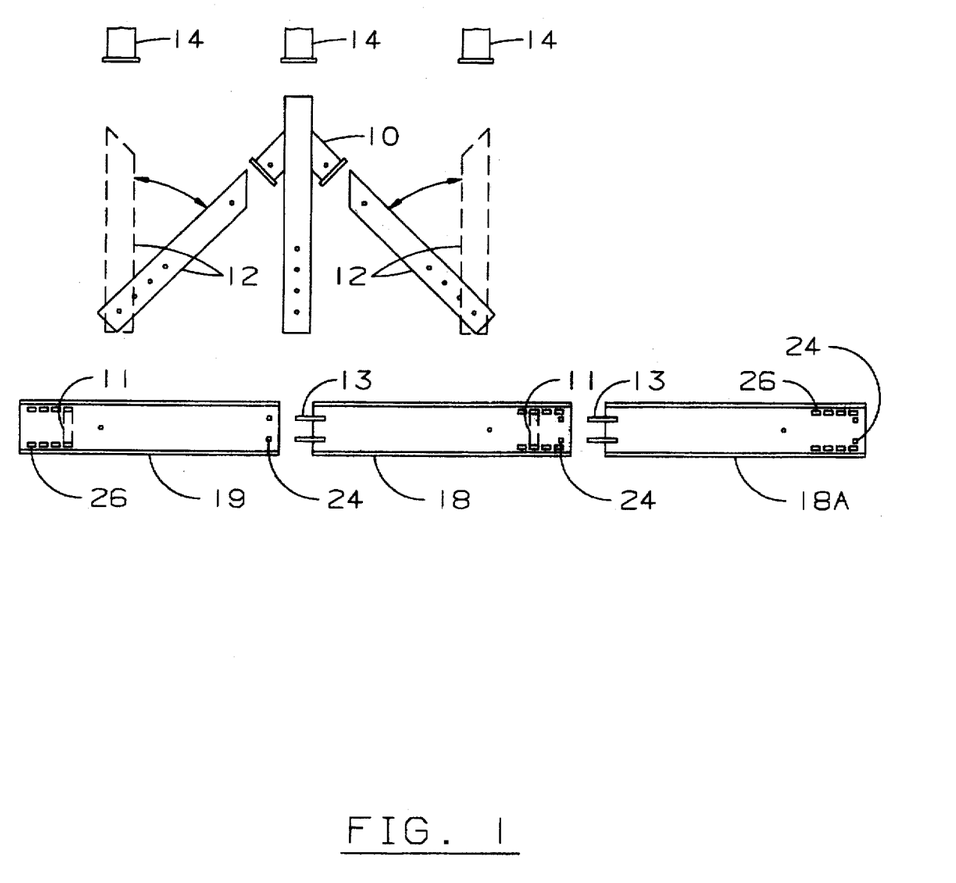
FIG. 1 is a top view of my device showing the major components of my invention.
Figure 2:
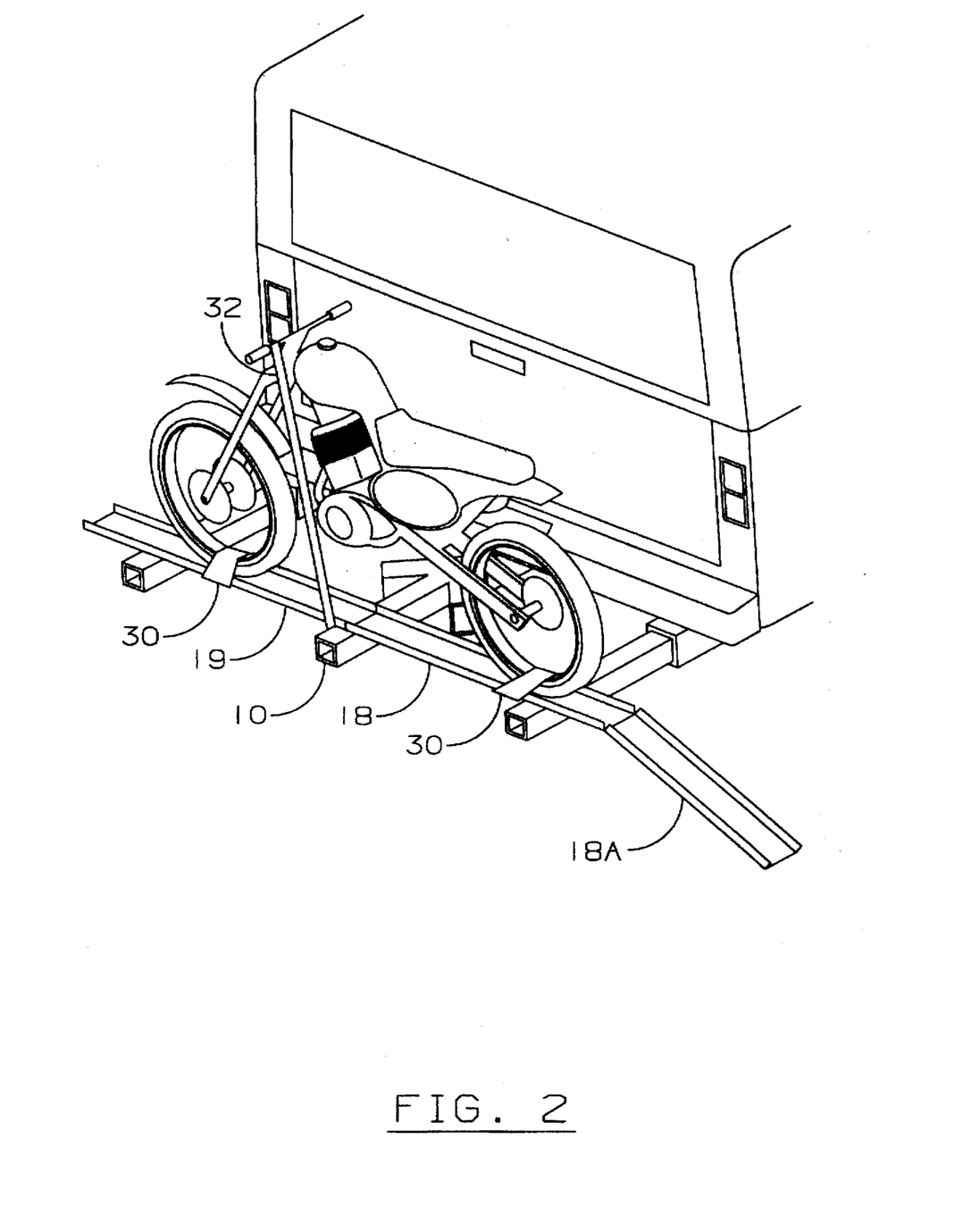
FIG. 2 is a perspective view of my device shown in place on a vehicle and supporting a motorcycle.
Figure 6:
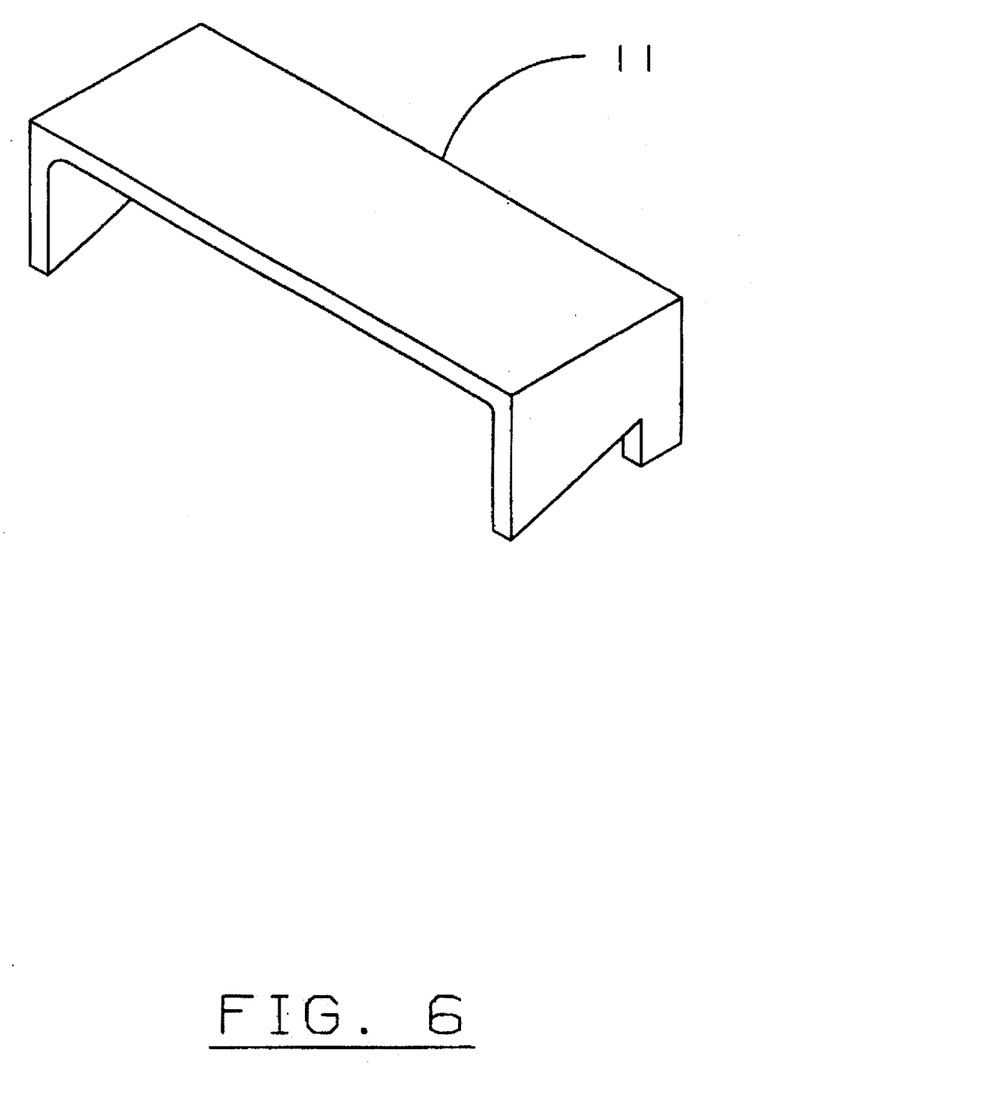
FIG. 6 is a perspective end view of a wheel stop which is inserted into various slots of varied positions located on the ramps.

As in FIG. 6, a wheel stop 11 is inserted into slots 26 pictured in FIG. 1. Tabs 13 are inserted into slots 24 to lock ramps 18 and 19 together and provide support for ramp 18a when being used as a loading ramp. Wheel stops 11, prevent lateral movement of the motorcycle.

Having thus described my invention, I claim as follows:

1. A carrier for a vehicle having a central hitch receiver and a pair of additional hitch receivers wherein each additional hitch receiver is positioned on an opposite side of the central hitch receiver; a carrier comprising:

A main support adapted to be secured to the central hitch receiver;

A pair of angle receivers positioned on opposite sides of the main support;

A ramp member having a central portion removably secured to an end of said main support and a pair of end portions positioned on opposite sides of the central portion; and A pair of auxiliary supports, each auxiliary support having one end rotatably secured to a respective end portion of the ramp member and another end adapted to be secured to a respective additional hitch receiver when the auxiliary support is rotated to an outer position and adapted to be secured to a respective angled receiver when the auxiliary support is rotated to an inner position.

* * * * *